United States Patent
Govindan et al.

(10) Patent No.: US 9,617,179 B2
(45) Date of Patent: Apr. 11, 2017

(54) ION SEQUESTRATION FOR SCALE PREVENTION IN HIGH-RECOVERY DESALINATION SYSTEMS

(71) Applicant: Massachusetts Institute of Technology, Cambridge, MA (US)

(72) Inventors: Prakash Narayan Govindan, Cambridge, MA (US); Windsor Sung, Lexington, MA (US); Steven Lam, Boston, MA (US); Maximus G. St. John, Cambridge, MA (US); John H. Lienhard, V, Lexington, MA (US); Mohammed Mirhi, Cambridge, MA (US); Anurag Bajpayee, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 378 days.

(21) Appl. No.: 13/958,968

(22) Filed: Aug. 5, 2013

(65) Prior Publication Data
US 2014/0263055 A1   Sep. 18, 2014

Related U.S. Application Data

(60) Provisional application No. 61/783,905, filed on Mar. 14, 2013.

(51) Int. Cl.
*C02F 5/12* (2006.01)
*C02F 9/00* (2006.01)
(Continued)

(52) U.S. Cl.
CPC .............. *C02F 5/12* (2013.01); *B01D 61/025* (2013.01); *B01D 61/364* (2013.01); *B01D 61/44* (2013.01);
(Continued)

(58) Field of Classification Search
None
See application file for complete search history.

(56) References Cited

U.S. PATENT DOCUMENTS

| 3,625,761 | A | * | 12/1971 | Tate | ........................ | C23G 1/36 |
|---|---|---|---|---|---|---|
| | | | | | | 134/10 |
| 5,225,087 | A | | 7/1993 | Kardos | | |
| 6,187,200 | B1 | * | 2/2001 | Yamamura | ........... | B01D 61/022 |
| | | | | | | 210/641 |

FOREIGN PATENT DOCUMENTS

| EP | 0207390 A1 | 1/1987 |
|---|---|---|
| EP | 0623561 A1 | 11/1994 |
| WO | 95/27683 A1 | 10/1995 |

OTHER PUBLICATIONS

Moghadasi et al. (2007), vol. RP5, Article 10, Scale Deposits in Porous Media and Their Removal by EDTA Injection.*
(Continued)

*Primary Examiner* — Allison Fitzsimmons
(74) *Attorney, Agent, or Firm* — Modern Times Legal; Robert J. Sayre

(57) ABSTRACT

Cations that can precipitate from an aqueous composition to produce scaling are sequestered by adding a multi-dentate ligand to the aqueous composition. The multi-dentate ligand bonds with the cation to form a non-scaling ionic complex; and the aqueous solution with the ionic complex is used in a process that produces substantially pure water from the aqueous composition, where the cation, absent formation of the ionic complex, is subject to scaling. The pH of the aqueous composition (or a brine including components of the aqueous composition) is then reduced to release the cation from the multi-dentate ligand; and the multi-dentate ligand, after the cation is released, is then reused in a predominantly closed loop.

14 Claims, 3 Drawing Sheets

(51) Int. Cl.
　　　*C09K 8/528*　　(2006.01)
　　　*B01D 61/02*　　(2006.01)
　　　*B01D 61/36*　　(2006.01)
　　　*B01D 61/44*　　(2006.01)
　　　*B01D 61/58*　　(2006.01)
　　　B01D 61/00　　(2006.01)
　　　C02F 1/04　　(2006.01)
　　　C02F 1/44　　(2006.01)
　　　C02F 1/68　　(2006.01)
　　　C02F 101/10　　(2006.01)
　　　C02F 103/08　　(2006.01)
　　　C02F 103/10　　(2006.01)
　　　B01D 61/14　　(2006.01)
　　　B01D 61/04　　(2006.01)

(52) U.S. Cl.
　　　CPC ................ *B01D 61/58* (2013.01); *C02F 9/00* (2013.01); *C09K 8/528* (2013.01); *B01D 61/04* (2013.01); *B01D 61/145* (2013.01); *B01D 2311/08* (2013.01); *C02F 1/04* (2013.01); *C02F 1/441* (2013.01); *C02F 1/444* (2013.01); *C02F 1/683* (2013.01); *C02F 2101/10* (2013.01); *C02F 2103/08* (2013.01); *C02F 2103/10* (2013.01); *C02F 2303/16* (2013.01)

(56) References Cited

OTHER PUBLICATIONS

Li, 2009, Experimental Analysis of Produced Water Desalination by a Humidirication-Dehumidification Process, pp. i-52 and cover page.*

Scott A. Sinex, "EDTA—A Molecule with a Complex Story", University of Bristol, School of Chemistry website <www.chm.bris.ac.uk/motm/edta/edtah.htm> (accessed Jan. 8, 2013) (Aug. 1, 2007).

European Patent Office, International Search Report and Written Opinion for PCT/US2014/024384 (corresponding PCT application) (May 23, 2014).

* cited by examiner

ION SEQUESTRATION FOR SCALE PREVENTION IN HIGH-RECOVERY DESALINATION SYSTEMS

RELATED APPLICATION

This application claims the benefit of U.S. Provisional Application No. 61/783,905, filed 14 Mar. 2013, the entire content of which is incorporated herein by reference.

BACKGROUND

In this century, the shortage of fresh water will surpass the shortage of energy as a global concern for humanity; and these two challenges are inexorably linked, as explained, for example, in the "Special Report on Water" in the 20 May 2010 issue of *The Economist*. Fresh water is one of the most fundamental needs of humans and other organisms; each human needs to consume a minimum of about two liters per day. The world also faces greater freshwater demands from farming and industrial processes.

The hazards posed by insufficient water supplies are particularly acute. A shortage of fresh water may lead to a variety of crises, including famine, disease, death, forced mass migration, cross-region conflict/war, and collapsed ecosystems. Despite the criticality of the need for fresh water and the profound consequences of shortages, supplies of fresh water are particularly constrained. 97.5% of the water on Earth is salty, and about 70% of the remainder is locked up as ice (mostly in ice caps and glaciers), leaving only a fraction of all water on Earth as available fresh (non-saline) water.

Moreover, the earth's water that is fresh and available is not evenly distributed. For example, heavily populated countries, such as India and China, have many regions that are subject to scarce supplies. Further still, the supply of fresh water is often seasonally inconsistent. Meanwhile, demands for fresh water are tightening across the globe. Reservoirs are drying up; aquifers are falling; rivers are dying; and glaciers and ice caps are retracting. Rising populations increase demand, as do shifts in farming and increased industrialization. Climate change poses even more threats in many regions. Consequently, the number of people facing water shortages is increasing. Naturally occurring fresh water, however, is typically confined to regional drainage basins; and transport of water is expensive and energy-intensive.

Additionally, water can be advantageously extracted from contaminated waste streams (e.g., from oil and gas production) both to produce fresh water and to concentrate and reduce the volume of the waste streams, thereby reducing pollution and contamination and reducing costs.

Nevertheless, many of the existing processes for producing fresh water from seawater (or from brackish water or contaminated waste streams) require massive amounts of energy. Reverse osmosis (RO) is currently the leading desalination technology. In large-scale plants, the specific electricity required can be as low as 4 kWh/m$^3$ at 30% recovery, compared to the theoretical minimum of around 1 kWh/m$^3$; smaller-scale RO systems (e.g., aboard ships) are less efficient.

Other existing seawater desalination systems include thermal-energy-based multi-stage flash (MSF) distillation, and multi-effect distillation (MED), both of which are energy- and capital-intensive processes. In MSF and MED systems, however, the maximum brine temperature and the maximum temperature of the heat input are limited in order to avoid calcium sulphate, magnesium hydroxide and calcium carbonate precipitation, which leads to the formation of soft and hard scale on the heat transfer equipment.

Humidification-dehumidification (HDH) desalination systems include a humidifier and a dehumidifier as their main components and use a carrier gas (e.g., air) to communicate energy between the heat source and the brine. A simple version of this technology includes a humidifier, a dehumidifier, and a heater to heat the seawater stream. In the humidifier, hot seawater comes in direct contact with dry air, and this air becomes heated and humidified. In the dehumidifier, the heated and humidified air is brought into (indirect) contact with cold seawater and gets dehumidified, producing pure water and dehumidified air. As with MSF and MED systems, precipitation of scaling components can occur within the system with consequent damage if the temperature rises too high.

Another approach, described in U.S. Pat. No. 8,119,007 B2 (A. Bajpayee, et al.), uses directional solvent that directionally dissolves water but does not dissolve salt. The directional solvent is heated to dissolve water from a salt solution into the directional solvent. The remaining highly concentrated salt water is removed, and the solution of directional solvent and water is cooled to precipitate substantially pure water out of the solution.

Some of the present inventors were also named as inventors on the following patent applications that include additional discussion of HDH and other processes for purifying water: U.S. application Ser. No. 12/554,726, filed 4 Sep. 2009 (published as US 2011/0056822 A1); U.S. application Ser. No. 12/573,221, filed 5 Oct. 2009 (published as US 20110079504 A1); U.S. application Ser. No. 13/028,170, filed 15 Feb. 2011; and U.S. application Ser. No. 13/241,907, filed 23 Sep. 2011; and U.S. application Ser. No. 13/550,094, filed 16 Jul. 2012.

SUMMARY

Apparatus and methods for preventing scaling in desalination and other processes are described herein. Various embodiments of the apparatus and methods may include some or all of the elements, features and steps described below.

In accordance with embodiments of the methods, cations that can precipitate from an aqueous composition to produce scaling are sequestered by adding a multi-dentate ligand to the aqueous composition. The multi-dentate ligand bonds with the cation to form a non-scaling ionic complex; and at least a portion of the aqueous composition with the ionic complex present or removed is used in a process involving the production of substantially pure water from the aqueous composition, where the cation, absent formation of the ionic complex, is subject to scaling. The pH of the aqueous composition (or a brine including components of the aqueous composition) including the ionic complex is then reduced to release the cation from the multi-dentate ligand; and the multi-dentate ligand, after the cation is released, is then reused in a predominantly closed loop (where most, though not necessarily all, of the multi-dentate ligand is recirculated and reused in each iteration of the process).

Embodiments of the apparatus include a source of an aqueous composition including at least one type of cation that can precipitate from the aqueous composition to produce scaling. A first conduit is configured to feed the aqueous composition from the aqueous-composition source to a desalination system; and a second conduit configured to feed a multi-dentate ligand from a multi-dentate-ligand source into the first conduit to bond the multi-dentate ligand with cations in the aqueous composition to form a non-scaling ionic complex. A pH-reduction apparatus is coupled with a source of a pH-reducing agent and is configured to separate the cations from the multi-dentate ligand at low pH levels. Moreover, a third conduit is configured to feed the non-scaling ionic complex in the aqueous composition or in a brine produced from the aqueous composition to the pH-reduction apparatus.

By sequestering cations that can otherwise produce scaling in a high-temperature operation, such as desalination (including various forms of aqueous waste treatment), the methods and apparatus described herein can improve the efficacy of the operation (e.g., higher recovery) and prevent damage to the apparatus. Additionally, the methods and apparatus can be operated at higher temperatures absent the risk of scaling (and consequent harm) at high temperatures. Further still, these methods can reduce the cost of pre-treatment of aqueous feeds to about 1/10th the cost of previous techniques using soda lime to soften the aqueous feed before desalination to thereby reduce scaling.

Figure 1:
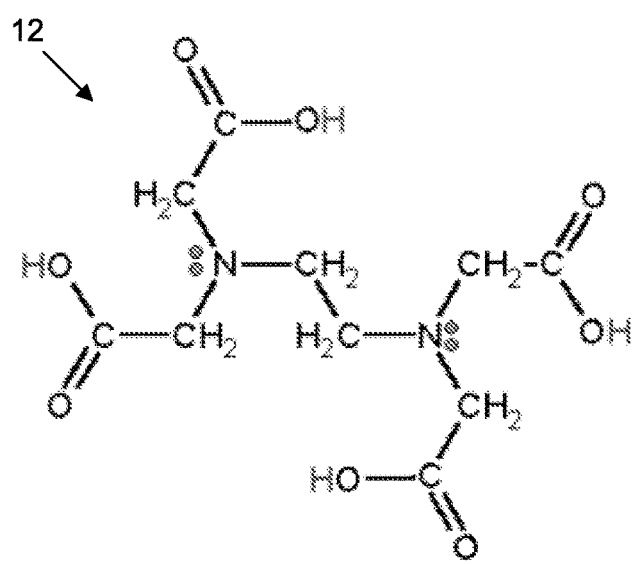
FIG. 1 is a molecular illustration of an $Na_4EDTA$ multi-dentate ligand.

In the accompanying drawings, like reference characters refer to the same or similar parts throughout the different views; and apostrophes are used to differentiate multiple instances of the same or similar items sharing the same reference numeral. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%, wherein percentages or concentrations expressed herein can be either by weight or by volume) can be understood as being within the scope of the description; likewise, if a particular shape is referenced, the shape is intended to include imperfect variations from ideal shapes, e.g., due to manufacturing tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Various ions (e.g., cations, such as $Ca^{2+}$, $Ba^{2+}$, $Sr^{2+}$, $Mg^{2+}$) found in aqueous compositions (e.g., sea water, brackish water or produced or flowback water resulting from shale-gas or shale-oil extraction) can precipitate to form scaling compounds by, for example, combining with carbonates and sulfates. This scaling may occur at high temperatures due to inverse solubility (i.e., lower solubility of the scaling compound at higher temperatures) and may compromise the treatment of the aqueous compositions and/or may foul or damage the high-temperature components of the apparatus, which tend to be the most expensive components in the apparatus.

According to the methods described herein, these scaling ions can be sequestered and prevented from precipitating by capturing the ions 14 in a chelating multi-dentate ligand 12, such as ethylenediamine tetra-acetic acid ($H_4EDTA$). In one embodiment, the multi-dentate ligand 12 can be provided in the form of $Na_4EDTA$, which forms $EDTA^{4-}$ in solution. An illustration of the molecular structure of $H_4EDTA$ is provided in FIG. 1. The hydrogen (H) atoms in the $H_4EDTA$ are released from the oxygen (O) atoms in the presence of the cations 14, and the oxygen atoms to which the hydrogen atoms were bonded in the $H_4EDTA$ then bind to the cations 14; additionally, the free electron pair on each of the nitrogen (N) atoms also forms a bond with the cations 14 to sequester each of the cations 14 orthogonally on six sides.

The chemical reaction of this process can be expressed as follows:

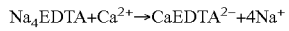
$$Na_4EDTA + Ca^{2+} \rightarrow CaEDTA^{2-} + 4Na^+$$

In the above expression, EDTA serves as the multi-dentate ligand (chelate), and calcium ($Ca^{2+}$) is the scaling ion. The capture of the calcium ion is facilitated by establishing a pH greater than 4 with $K_s$ substantially greater than 1 in the aqueous composition. As shown, above, one mole of EDTA traps one mole of metal-divalent or transition-metal ion. Specifically, in this case, when sequestered as $CaEDTA^{2-}$, the calcium ion is trapped and does not scale. The resulting new complex ion ($CaEDTA^{2-}$) has a much higher solubility than even sodium chloride (NaCl) under the relevant temperatures.

The use of EDTA as the multi-dentate ligand is advantageous because of its high stability constant, though any of a variety of other ligands can be used. Examples of ligands that may be used in these methods are provided in Table 1, below, with their respective stability constants.

TABLE 1

| Ligand | Stability Constant |
|---|---|
| EDTA | 10.7 |
| Triphosphate | 6.5 |
| nitrilotriacetic acid (NTA) | 6.41 |
| Tetrametaphosphate | 5.2 |
| Pyrophosphate | 5 |

Figure 2:
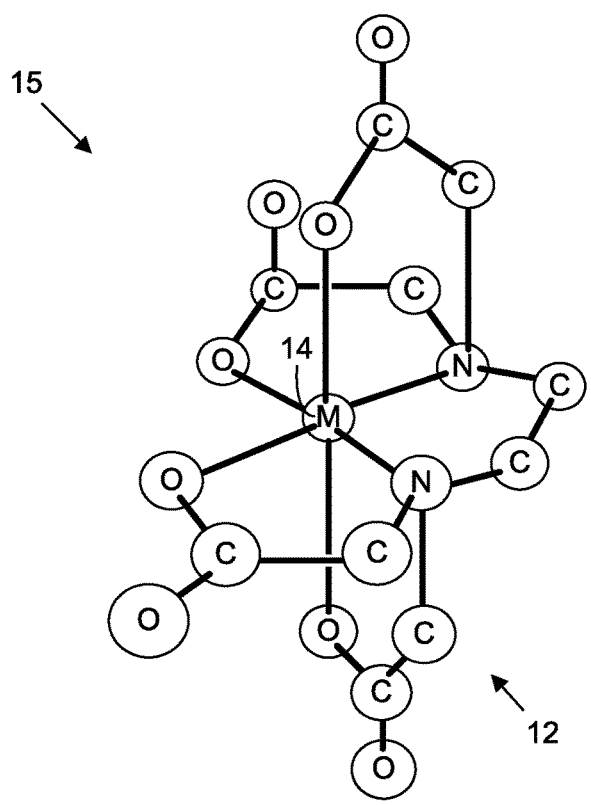
FIG. 2 is a molecular illustration of an $Na_4EDTA$ multi-dentate ligand sequestering a cation.
Figure 3:
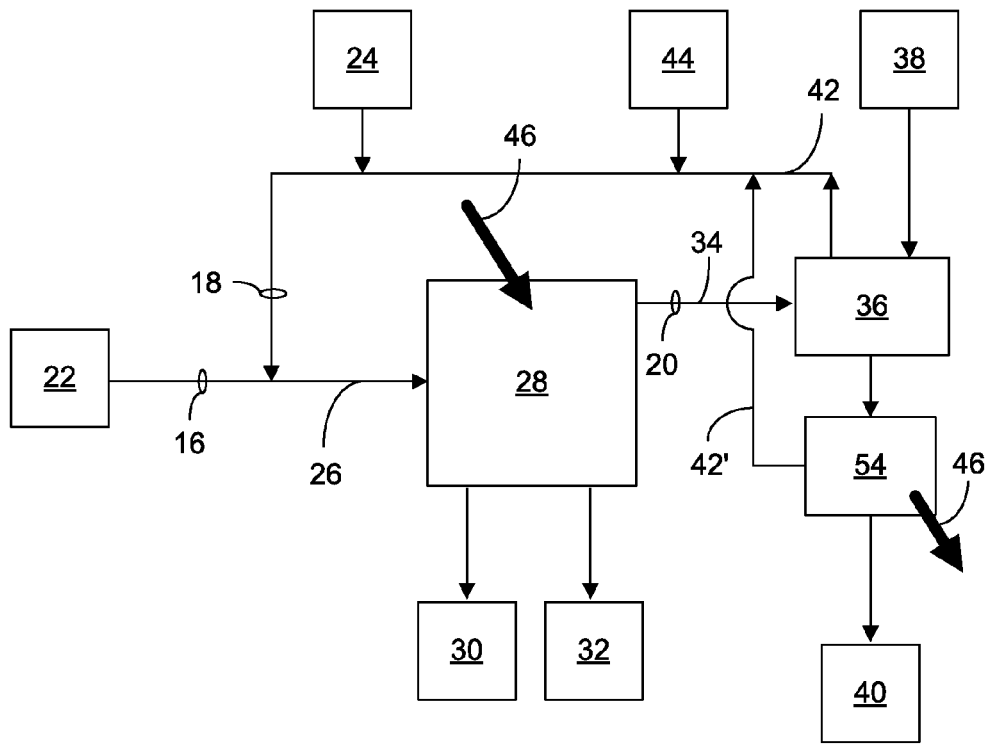
FIG. 3 is a schematic illustration of a first embodiment of an apparatus for scaling-preventive desalination.

A schematic illustration of a first embodiment of an apparatus for scale-preventive desalination is provided in FIG. 3. In this embodiment, the aqueous feed composition is produced water from oil or gas extraction. The aqueous composition can be fed from a source 22, such as a tank or an open pool, into a high-recovery desalination system 28 via a first conduit 16. The multi-dentate ligand 12 can initially be supplied by and replenished from a source 24 and injected into the first conduit 16, where the multi-dentate ligand 12 captures the cation 14 to form a non-scaling ionic complex 15, as shown in FIG. 2 (where hydrogen bonds are omitted from the illustration for simplicity), which is then injected with the produced water into a high-recovery desalination system 28 into which thermal energy 46 is also fed.

Figure 5:
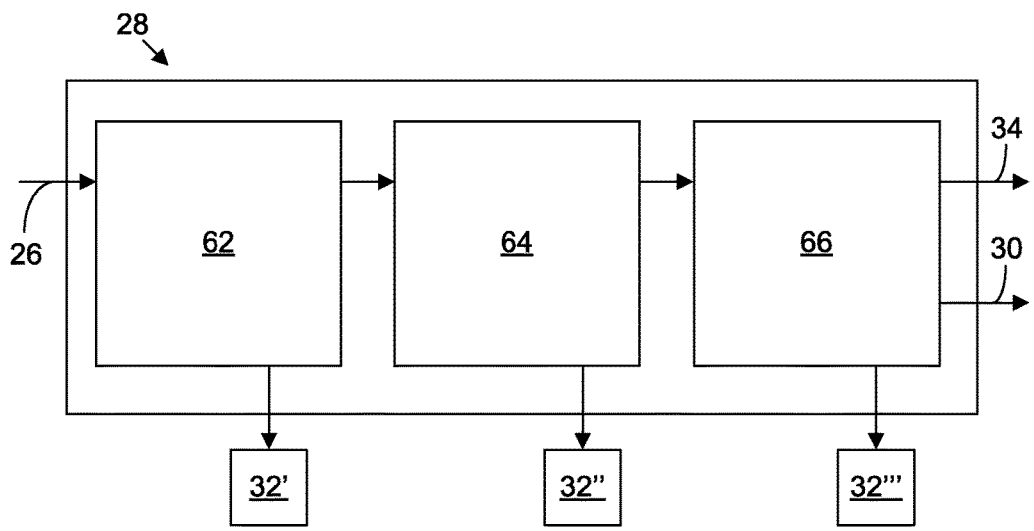
FIG. 5 is a schematic illustration of a high-recovery desalination system that can be used in the apparatus of FIG. 3, 4 or 6.

A schematic illustration of the components of an embodiment of the high-recovery desalination system 28 is provided in FIG. 5. The aqueous composition 26 (e.g., produced water) is fed first via a conduit through a reverse-osmosis unit 62, from which a first fresh-water output 32' is extracted via a first output conduit. The remaining aqueous brine composition is then fed via a conduit through a mechanical vapor compression distillation unit 64, from which second fresh-water output 32" is extracted via a second output conduit. The remaining aqueous brine composition is then fed via a conduit through a crystallizer 66, from which a third fresh-water output 32''' is extracted via a third output conduit. The crystallizer 66 also outputs (a) a brine 34 including the cation 14 still sequestered by the multi-dentate ligand 12 in the form of the ionic complex 15 and (b) a solid (crystallized) output 30 of, e.g., NaCl, KCl, $Na_2SO_4$, and $Na_2CO_3$. Alternatively, or in addition, the high-recovery distillation system 28 can include units for multi-stage flash distillation (MSF), multiple-effect distillation (MED), extractive distillation (ED), membrane distillation (MD), humidification/de-humidification (HDH) distillation, etc.

These distillation processes can be carried out in this method at temperatures (e.g., at least 50° C.) at which the cation 14 would precipitate from the aqueous composition 26, were the cation 14 not captured by the multi-dentate ligand 12.

Returning to FIG. 3, the brine 34 including the ionic complex 15 from the high-recovery desalination system 28, after the fresh (substantially pure) water 32 and solids 30 are removed, is fed via third conduit 20 into a pH-reduction chamber 36, where the pH of the brine 34 can be reduced to below 2 via the addition of an acid (e.g., hydrochloric acid, sulphuric acid or oxalic acid) from a source 38. In particular embodiments, where oxalic acid is added, the pH need only be reduced to a pH of about 5 (or less) because the oxalic acid can trigger the precipitation of calcium oxalate rather than EDTA from the ionic complex. This lowering of the pH causes the multi-dentate ligand 12 to disassociate from the cation 14. The multi-dentate ligand 14 with remaining aqueous composition is then fed as a recycled feed 42 through a second conduit 18 back to the first conduit 16 through which the initial aqueous composition 26 is fed. En route, a neutralizing base, such as NaOH, is injected from a source 44 into the second conduit 18 to raise the pH of the recycled feed 42 to about neutral; and additional (replenishing) multi-dentate ligand 14 can be injected into the second conduit 18 from source 24.

Figure 4:
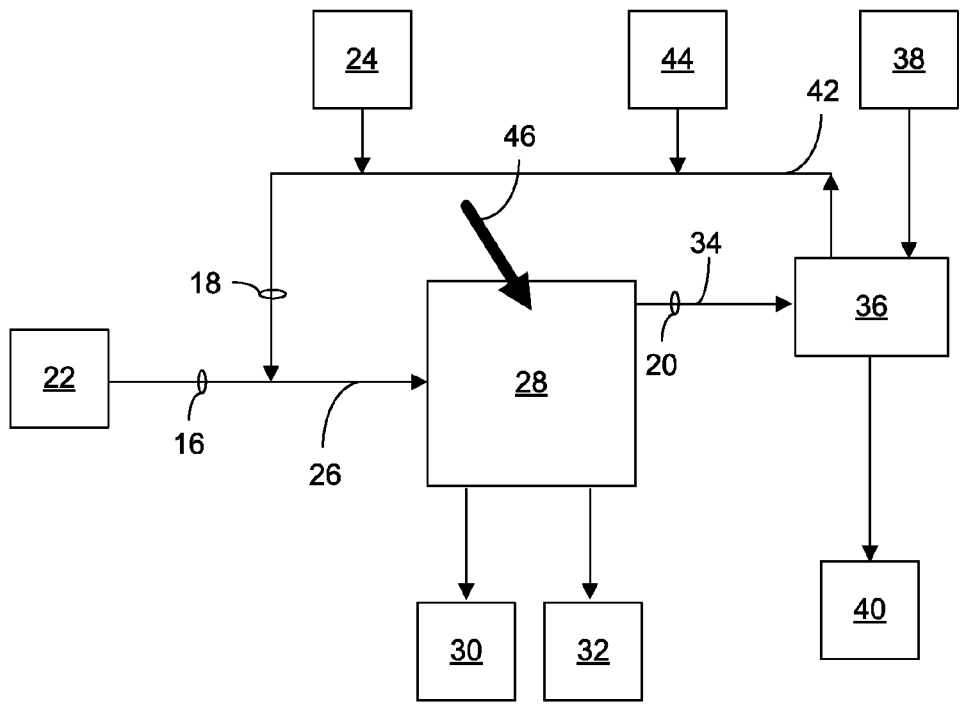
FIG. 4 is a schematic illustration of a second embodiment of an apparatus for scaling-preventive desalination.

Brine (after the removal of multi-dentate ligand 12 in composition 42) that is output from the pH-reduction chamber 36 is fed to a chiller 54 that extracts thermal energy 46 from the brine (e.g., reducing the temperature of the brine to less than 20° C.). The thermal energy 46 extracted from the brine can then be transferred via a thermally conductive link and reintroduced into the high-recovery desalination system 28. Cooling the brine in the chiller 54 results in the separation of additional multi-dentate ligand 12 (that was not released in the pH-reduction chamber 36) from the cation 14 in the brine. Composition 42' with the additional release of multi-dentate ligand 12 is injected into the flow of composition 42 from the chiller 54 to recycle even more of the multi-dentate ligand 12. The chiller 54 also outputs brine including the released ions (e.g., Na, Ca, Ba, Sr, and/or Mg, as well as Cl) to a reservoir 40. A second embodiment of the apparatus without the chiller 54 and without the additional release of composition 42' therein is illustrated in FIG. 4.

Figure 6:
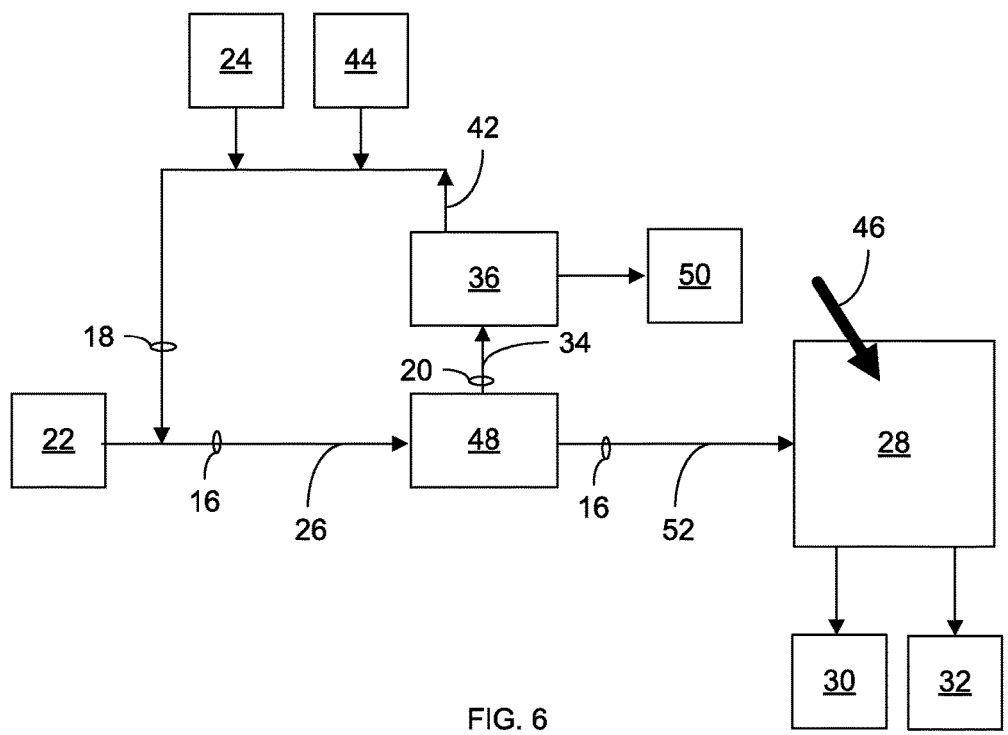
FIG. 6 is a schematic illustration of a third embodiment of an apparatus for scaling-preventive desalination.

A schematic illustration of a third embodiment of an apparatus for scale-preventive desalination is provided in FIG. 6. In this embodiment, the aqueous composition feed 26 is fed via first conduit 16 through an ultra-filtration unit 48, which can include a membrane having sub-1-μm pores through which the aqueous composition feed 26 flows. The ultra-filtration unit 48 removes the ionic complex 15 from the aqueous composition 26 before the remnant 52 of the aqueous composition is injected into the high-recovery desalination system 28. The brine 34 with the ionic complex 15 that was filtered out of the aqueous composition 26 by the ultra-filtration unit 48 is directed via the third conduit 20 into the pH-reduction chamber 36. The pH-reduction chamber 36 outputs a brine with the released cations to a reservoir 50 and also outputs a composition 42 including the multi-dentate ligand 12 for reinjection into the aqueous feed composition 26 via the second conduit 18. Accordingly, this embodiment differs from the first and second embodiments (shown in FIGS. 3 and 4) in that the non-scaling ionic complex 15 is removed from the aqueous feed composition 16 before it reaches the high-recovery desalination system 28.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for sequestering cations that can precipitate from an aqueous composition, the method comprising:

adding a multi-dentate ligand to an aqueous composition that includes monovalent ions and at least one type of dissolved divalent cation that can precipitate from the aqueous composition to produce scaling;

then enabling the multi-dentate ligand to bond with the dissolved divalent cation to form an aqueous non-scaling ionic complex;

then filtering the aqueous non-scaling ionic complex from the aqueous composition with a membrane that retains the aqueous non-scaling ionic complex in a retentate stream and that passes a filtrate stream comprising water and monovalent ions;

reducing the pH of the retentate stream to release the dissolved divalent cation from the multi-dentate ligand;

after the non-scaling ionic complex is filtered from the aqueous composition, separating purified water from at least a portion of the filtrate of the aqueous composition and leaving a concentrated remainder of the filtrate of the aqueous composition in a high-recovery desalination system where the divalent cation, absent formation and removal of the ionic complex, would be subject to scaling; and after the dissolved divalent cation is released from the multi-dentate ligand, reintroducing the multi-dentate ligand into additional aqueous composition to form additional non-scaling ionic complex in a predominantly closed loop.

2. The method of claim 1, wherein the dissolved divalent cation includes at least one of the following: calcium, barium, strontium and magnesium.

3. The method of claim 1, wherein the aqueous composition includes flowback water or produced water from oil or gas extraction.

4. The method of claim 1, wherein the aqueous composition includes at least one of sea water and brackish water.

5. The method of claim 1, wherein the aqueous composition includes waste water.

6. The method of claim 1, wherein the pH of the retentate is reduced via addition of an acid to release the scaling component from the multi-dentate ligand.

7. The method of claim 1, wherein the separation of the purified water from the monovalent ions of the filtrate of the aqueous composition in the high-recovery desalination system is performed via a desalination process selected from at least one of the following: reverse osmosis, multi-stage flash distillation, multiple-effect distillation, mechanical vapor recompression, electrodialysis, membrane distillation, directional solvent extraction and humidification-dehumidification.

8. The method of claim 1, further comprising heating the filtrate of the aqueous composition up to a temperature at which the cation would precipitate from the aqueous composition absent bonding of the scaling component in the non-scaling ionic complex.

9. The method of claim 8, wherein the filtrate of the aqueous composition is heated up to a temperature of at least 50° C.

10. The method of claim 1, wherein the monovalent ions include at least one dissolved component selected from NaCl, KCl, $Na_2SO_4$, and $Na_2CO_3$.

11. The method of claim 1, wherein the pH of the retentate including the ionic complex is reduced by adding an acid to the retentate, the method further comprising adding a base to the retentate after the multi-dentate ligand is released and removed, wherein the base neutralizes the acid.

12. The method of claim 1, wherein the retentate including the ionic complex is cooled to less than 20° C. after the pH is reduced to increase the amount of multi-dentate ligand released from the cation.

13. The method of claim 1, wherein the multi-dentate ligand comprises an ethylenediamine tetra-acetate ion.

14. The method of claim 7, wherein the desalination process is a humidification-dehumidification process.

* * * * *